United States Patent [19]
Ashman

[11] Patent Number: 5,549,315
[45] Date of Patent: Aug. 27, 1996

[54] APPARATUS FOR MOUNTING A CYCLE WHEEL

[76] Inventor: J. Leonard Ashman, 3962 Third Ave., Sacramento, Calif. 95817

[21] Appl. No.: 225,837

[22] Filed: Apr. 11, 1994

[51] Int. Cl.$^6$ .................................................. B62K 25/02
[52] U.S. Cl. .................. 280/279; 280/288; 301/110.5; 301/111; 301/124.2
[58] Field of Search .................... 280/274, 276, 280/279, 281.1, 288, 284; 301/110.5, 111, 121, 122, 124.2, 126, 105.1, 110.6, 114, 115

[56] References Cited

U.S. PATENT DOCUMENTS

| 4,079,958 | 3/1978 | Segawa | 301/124.2 |
| 4,170,369 | 10/1979 | Strutman | 280/261 |
| 4,400,038 | 8/1983 | Hosokawa | 301/111 |
| 4,634,139 | 1/1987 | Watanabe et al. | 280/288 |
| 4,659,097 | 4/1987 | Kupper et al. | 280/274 |
| 4,805,941 | 2/1989 | Downing et al. | 280/279 |
| 5,022,672 | 6/1991 | Kawai | 280/281.1 |
| 5,058,913 | 10/1991 | La Riviere et al. | 280/281.1 |
| 5,118,125 | 6/1992 | Plunkett | 280/279 |
| 5,326,157 | 7/1994 | Nagano | 301/111 |

FOREIGN PATENT DOCUMENTS

| 8704129 | 7/1987 | WIPO | 301/111 |

*Primary Examiner*—Anne Marie Boehler
*Attorney, Agent, or Firm*—Thomas R. Lampe

[57] ABSTRACT

Apparatus for mounting a cycle wheel at either the front or rear of a bicycle. Socket members having notches for receiving wheel supports are connected to the front and back forks of the bicycle. The apparatus includes a lock for locking the socket members against movement with the notches both oriented in a desired direction so that cycle wheel removal and installation is facilitated.

8 Claims, 6 Drawing Sheets

5,549,315

APPARATUS FOR MOUNTING A CYCLE WHEEL

TECHNICAL FIELD

This invention relates to apparatus for mounting a cycle wheel on a cycle frame. More particularly, the apparatus allows the use of the same wheel at both the front and back of a bicycle. The cycle wheel can be quickly removed and installed at either the front or back locations.

BACKGROUND ART

Applicant is aware of the following United States patents relating to cycle wheel installation on bicycles and the like: U.S. Pat. No. 4,170,369, Oct. 9, 1979, U.S. Pat. No. 5,118, 125, issued Jun. 2, 1992, U.S. Pat. No. 5,058,913, Oct. 22, 1991, U.S. Pat. No. 4,659,097, Apr. 21, 1987, U.S. Pat. No. 5,022,672, issued Jun. 11, 1991, U.S. Pat. No. 4,634,139, issued Jan. 6, 1987, U.S. Pat. No. 4,400,038, issued Aug. 23, 1983, and U.S. Pat. No. 4,805,941, issued Feb. 21, 1989.

The invention disclosed and claimed herein differs in a number of important respects from the known prior art. The present invention can be utilized with standard fork frames and allows for the complete interchangeability of a cycle wheel between the back and front positions of a bicycle. Structure employed in the apparatus of the present invention automatically positions sockets engageable by the wheels in proper position for receiving wheel supports.

The invention disclosed and claimed herein has other advantages over the prior art approaches which can be relatively complex and expensive. The present apparatus, in contrast, is simple, relatively inexpensive and highly durable. Derailleurs and other drive mechanisms are maintained separate from the mounting apparatus and thus provide no impediment to fast and efficient cycle wheel removal or installation.

DISCLOSURE OF INVENTION

The present invention relates to apparatus for mounting a cycle wheel on a cycle frame, the cycle wheel including a hub having end flanges and first and second wheel supports projecting outwardly from the end flanges. The cycle includes one fork having first and second cycle legs with distal ends, the cycle legs being located away from one another and defining a space therebetween for accommodating the cycle wheel.

The apparatus includes a first socket member located at the distal end of the first cycle leg and defining a first notch and entry opening to the first notch for receiving and accommodating in the first notch a first wheel support of a cycle wheel.

A second socket member is located at the distal end of the second cycle leg and defines a second notch and an entry opening to the second notch for receiving and accommodating in the second notch a second wheel support of a cycle wheel.

A first connector member rotatably connects the first socket member to the distal end of the first cycle leg with the first socket member and the first notch located in the space between and defined by the cycle leg.

A second connector member rotatably connects the second socket member to the distal end of the second cycle leg with the second socket member and the second notch located in the space between and defined by the cycle legs, the first and second socket members being in alignment.

Lock means is provided for selectively locking the socket members substantially simultaneously against rotational movement relative to their respective cycle legs, the locking means maintaining the entry openings to the first and second notches at the same predetermined orientation with respect to the cycle frame when the socket members are locked against rotational movement.

The apparatus also includes manually operable actuator means cooperable with the lock means for selectively actuating and deactuating the lock means. The manually operable actuator means at least partially comprises a support spindle for insertion into a cycle wheel hub to rotatably support a cycle wheel.

The support spindle is movable between first and second spindle positions. The support spindle, when in the first position, is cooperable with the lock means and the socket members to allow rotational movement of the socket members. When in the second spindle position, the support spindle is cooperable with the lock means and the socket members to prevent rotational movement of the socket members and maintain the entry openings to the first and second notches at the same predetermined orientation with respect to the cycle frame to facilitate installation of a cycle wheel.

Other features, advantages, and objects of the present invention will become apparent with reference to the following description and accompanying drawings.

MODES FOR CARRYING OUT THE INVENTION

Figure 1:
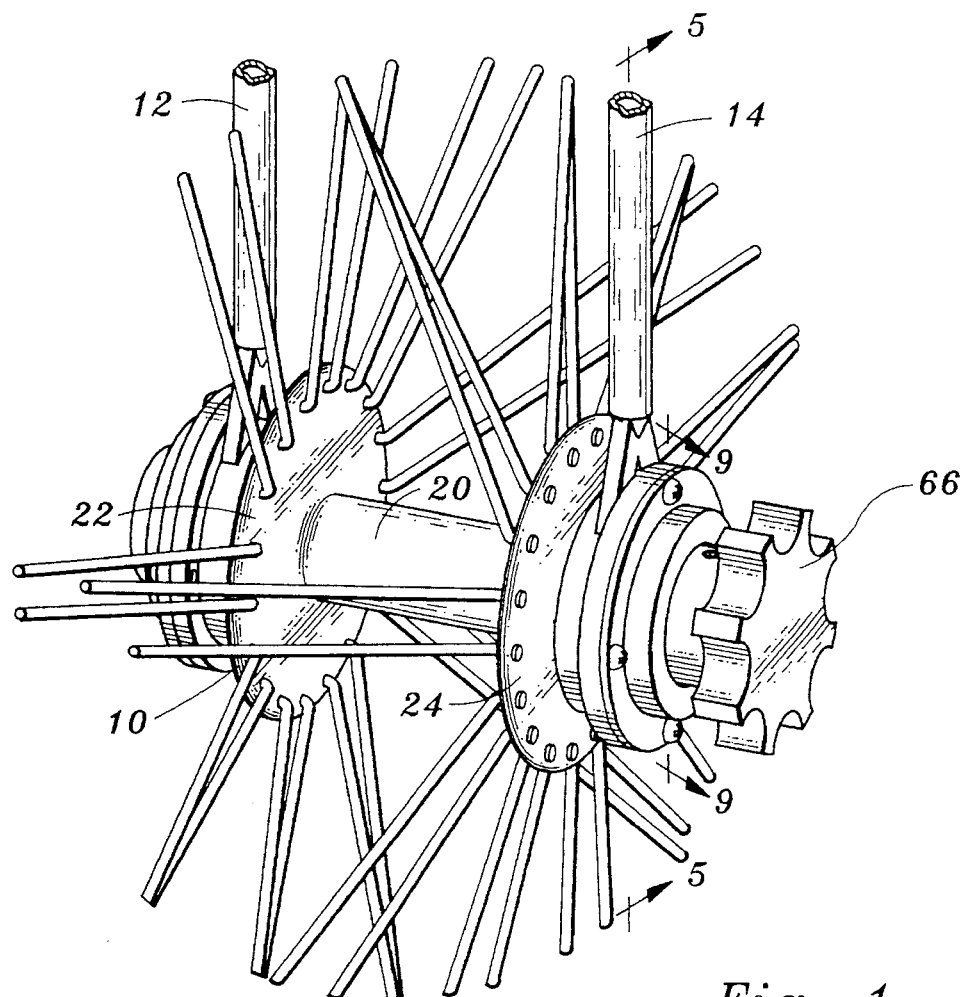
FIG. 1 is a perspective view of apparatus constructed in accordance with the teachings of the present invention holding a cycle wheel in position on a cycle frame.

Referring to FIGS. 1-9, the apparatus of the present invention is for mounting a cycle wheel 10 at either the front or back of a bicycle including a front fork having first and second cycle legs 12, 14 with distal ends. The cycle legs 12, 14 are located away from one another and define a space therebetween for accommodating the cycle wheel.

The bicycle also includes a rear fork having legs 16, 18. One or more of these rear legs are shown in FIGS. 4, 6, 8a and 8b and also have distal ends, the cycle legs 16, 18 being located away from one another and defining a space therebetween for accommodating the cycle wheel.

Utilizing the teachings of the present invention, the wheel 10 is completely interchangeable between the front and back of the bicycle. The cycle wheel 10 includes a hub 20 and end flanges 22, 24. As is conventional, the end flanges are utilized to retain spoke ends therein in the illustrated embodiment. In the interest of simplicity, the spokes are not shown in all of the figures. Of course, the teachings of the present invention also have application to cycle wheels without spokes. Wheel supports 26, 28 having flat sides project outwardly from the end flanges.

The distal ends 30, 32 of legs 12, 14 are circular-shaped and define circular openings 34, 36 therein. Opening 34 accommodates therein a roller bearing 38 of conventional construction.

A socket member 40 is rotatably journaled within roller bearing 38. Socket member 40 defines a notch 42 having an entry opening 44. The notch and entry opening are for receiving and accommodating in the notch the wheel support 26. The notch and wheel support are so configured as to prevent relative rotation between the cycle wheel and the socket member. The socket member 38 has a throughbore 46. Socket member 40 also has a reduced end 48 which not only passes through roller bearing 38 but enters the cavity of a cup-shaped member 50 having a threaded hole 52 therein. A coil compression spring 54 is positioned within the reduced end of socket member 40 and in alignment with the threaded hole 52.

Figure 5:
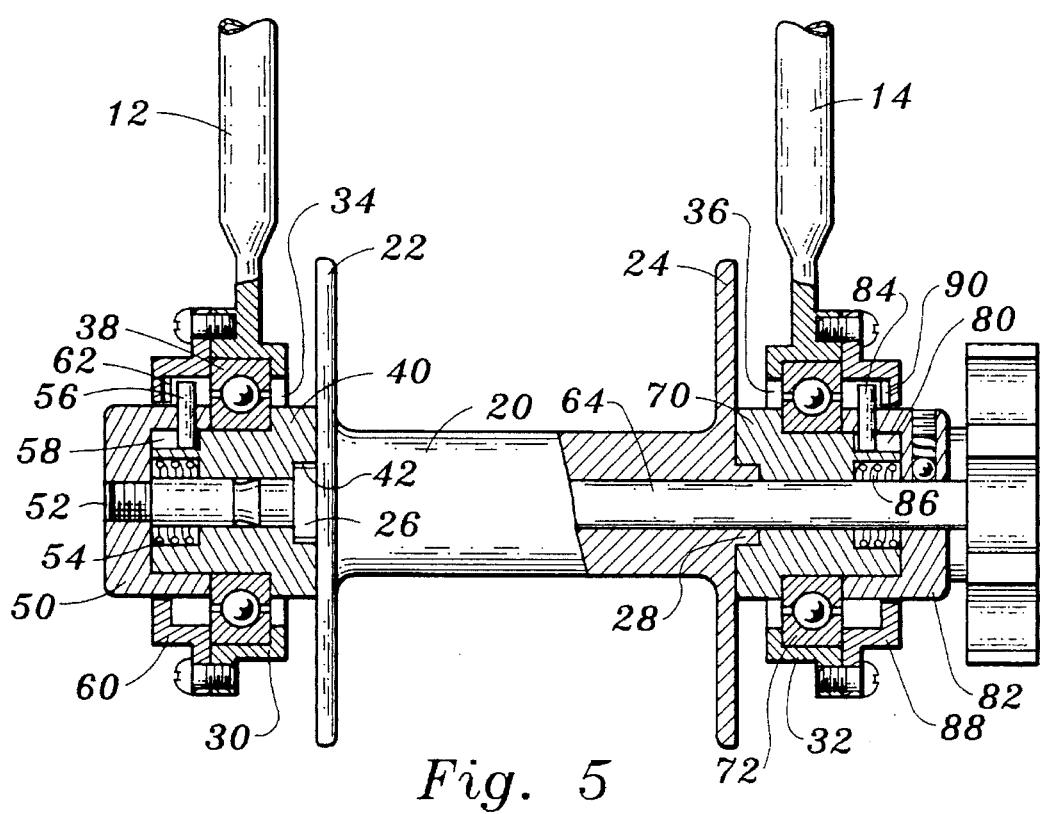
FIG. 5 is an enlarged, cross-sectional view taken along the line 5—5 of FIG. 1.

A locking pin or detent 56 projects upwardly from member 50 and also downwardly therefrom into the interior of the member, as may perhaps best be seen with reference to FIG. 5. In FIG. 5, the downwardly projecting segment of pin 56 is located within an indent 58 formed at the periphery of the socket member 40 at the end thereof opposed to notch 42. A securement cap 60 is connected to the distal end 30 by mechanical fasteners and assists in holding the aforedescribed structural elements in position with respect thereto. Securement cap 60 has an indent 62 formed at the inner rim thereof.

When a cycle wheel is held in position and connected to leg 12 as shown in FIG. 5, a support spindle 64 having handle 66 projects through hub 20 with the end of the spindle remote from handle 66 located in throughbore 46 of the socket member 40 and also in the threaded hole 52 of member 50. The end of the support spindle is itself threaded and threadedly engages the threaded hole 52. This pulls cup-shaped member 50 toward socket 40 against the bias exerted by spring 54 and causes the outwardly directed end of locking pin 56 to be pulled out of indent 62 so that the socket member is free to rotate. Thus, the wheel hub is also free to rotate relative to the distal end of leg 12.

A somewhat similar arrangement is utilized at the distal end of leg 14 wherein socket member 70 is rotatably journaled within a roller bearing 72 located within the confines of distal end 32. A notch 74 having an entry opening 76 is formed by socket member 70 as is a throughbore 78 and an indent 80. The reduced end of socket member 70 is positioned in a cup-shaped member 82 having a locking pin 84 projecting both interiorly and exteriorly thereof. A coil compression spring 86 continually urges the member 82 and socket member 70 away from each other. A securement cap 88 is attached by mechanical fasteners to the distal end 32 and assists in retaining the aforesaid structural components in place.

An indent 90 is formed at the interior surface of securement cap 88. When the spindle has the threaded end thereof threaded within threaded hole 52 of cup-shaped member 50, the spindle element handle bears against member 82 and urges same against the bias exerted by spring 86 and toward socket member 70. The locking pin 84 is thus withdrawn from indent 90, allowing the socket member 70 and wheel hub to freely rotate.

Figure 7A:
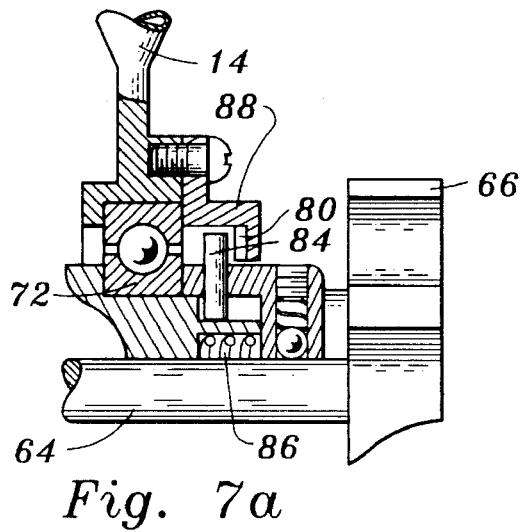
FIGS. 7a through 7c are partial, sectional views illustrating structural components of the apparatus employed on one of the fork legs and the relative positions assumed thereby when initiating cycle wheel removal.
Figure 7B:
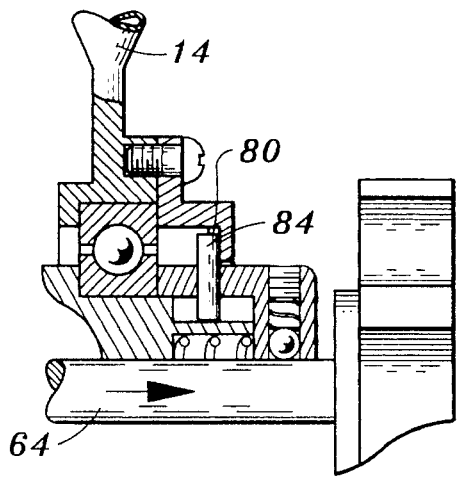
Figure 7C:
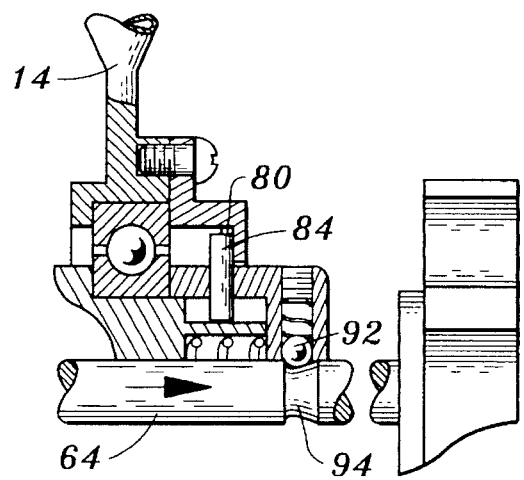
Figure 8B:
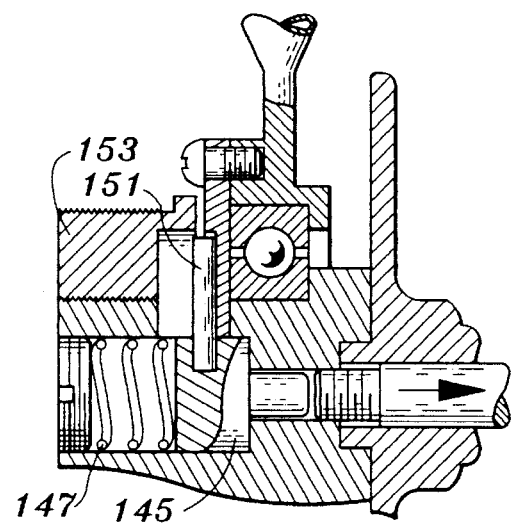
Figure 9:
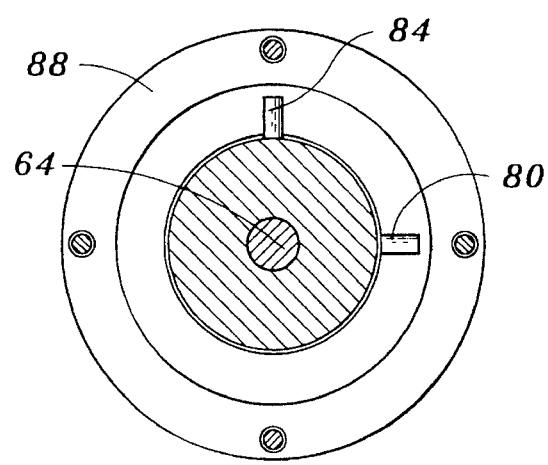
FIG. 9 is an enlarged, sectional view taken along the line 9—9 in FIG. 1.

FIGS. 7a through 7c illustrate sequentially what happens at the distal end of leg 14 when spindle 64 is unthreaded to allow removal of the cycle wheel. FIG. 7a shows the situation when the spindle is threaded in place. As shown in FIG. 7b, unthreading of the support spindle from threaded hole 52 of cup-shaped member 50 will move the spindle to the right as shown by the arrow. Rotation of the cycle wheel by the person performing the task of wheel removal will bring locking pin 84 into registry with indent 80 and the locking pin will seat therein under the urging of spring 86.

A similar operation occurs simultaneously at distal end 30 of front leg 12 wherein locking pin 56 will seat in indent 62. Indents 62 and 80 are in registry and the locking pins 56 and 84 also are in alignment. This will locate the entry openings leading to notches 42 and 74 at exactly the same orientation with respect to the cycle frame and the socket members are locked against further rotational movement at this point when the spindle has been threadedly disengaged.

Figure 2:
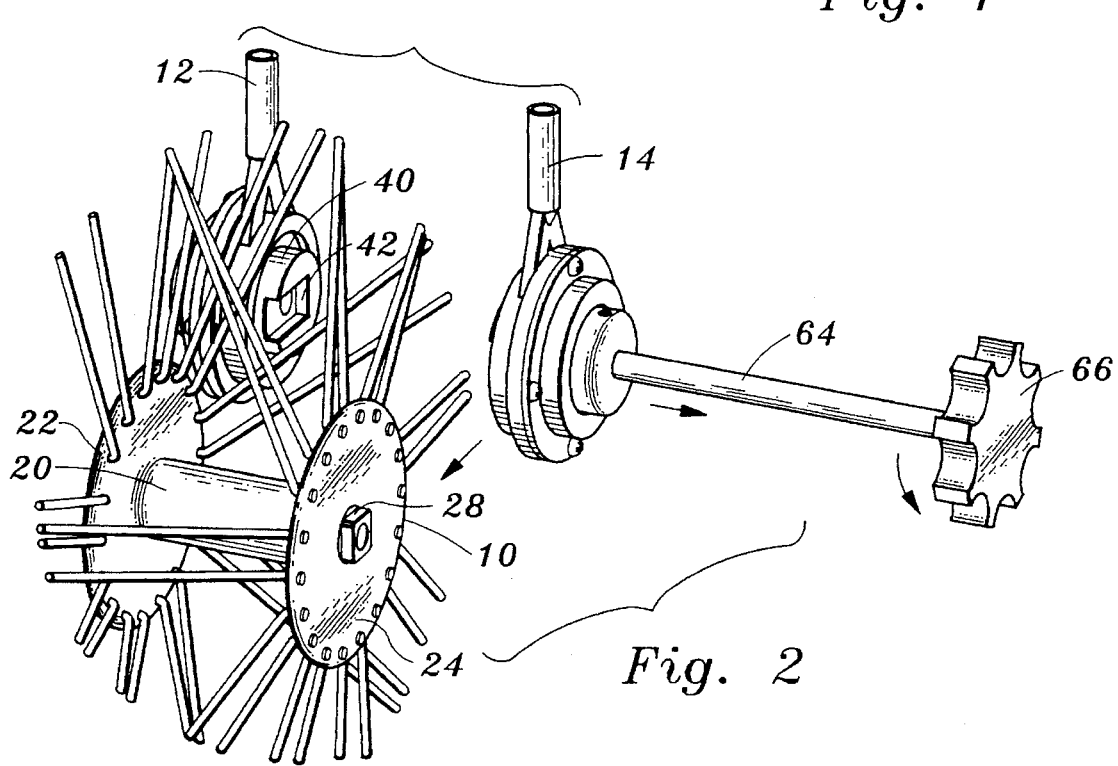
FIG. 2 is a view similar to FIG. 1, but illustrating the cycle wheel having been removed.
Figure 3:
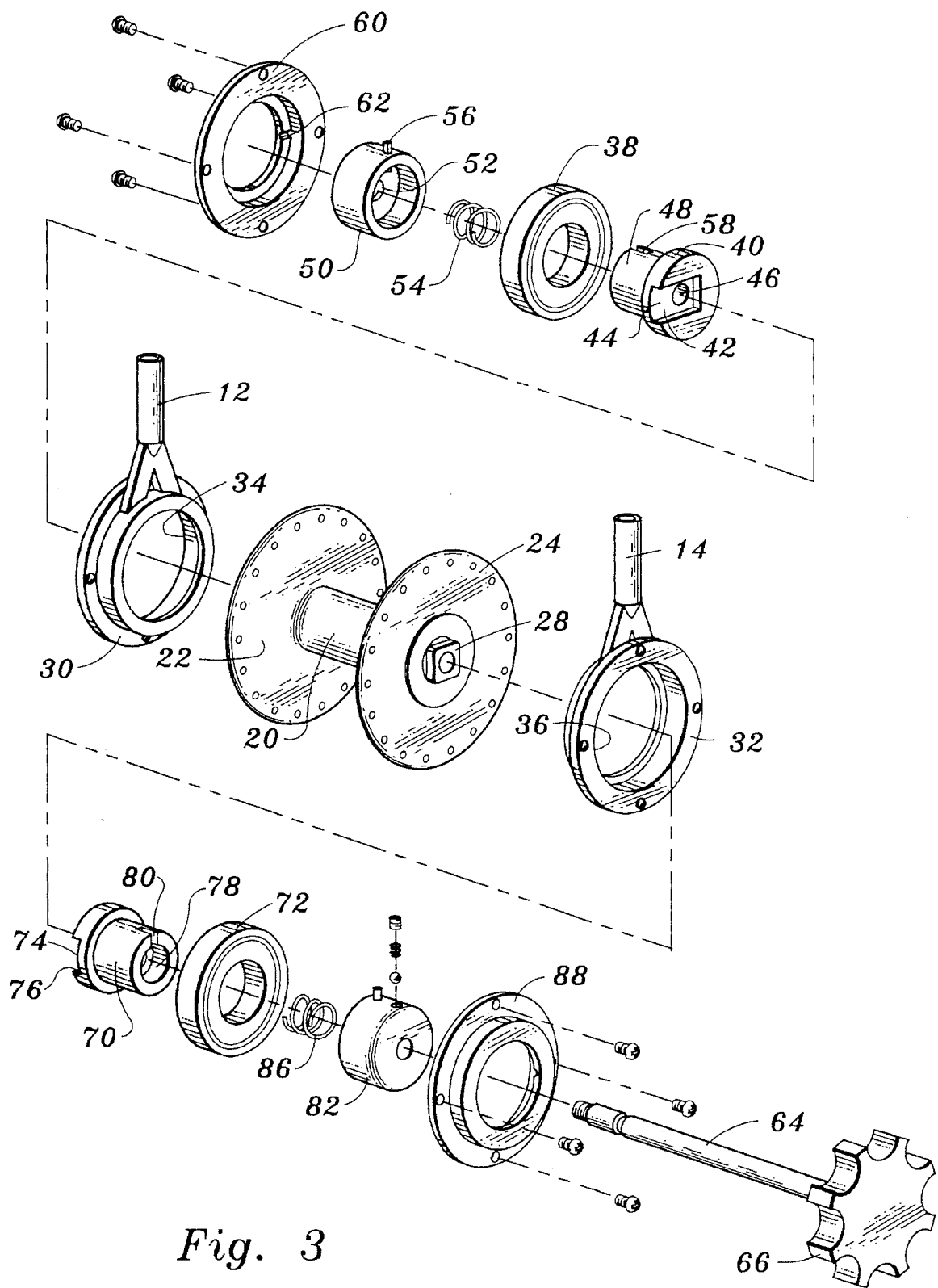
FIG. 3 is an exploded, perspective view of a cycle wheel hub and apparatus structure employed to mount the hub at the front of a bicycle.
Figure 4:
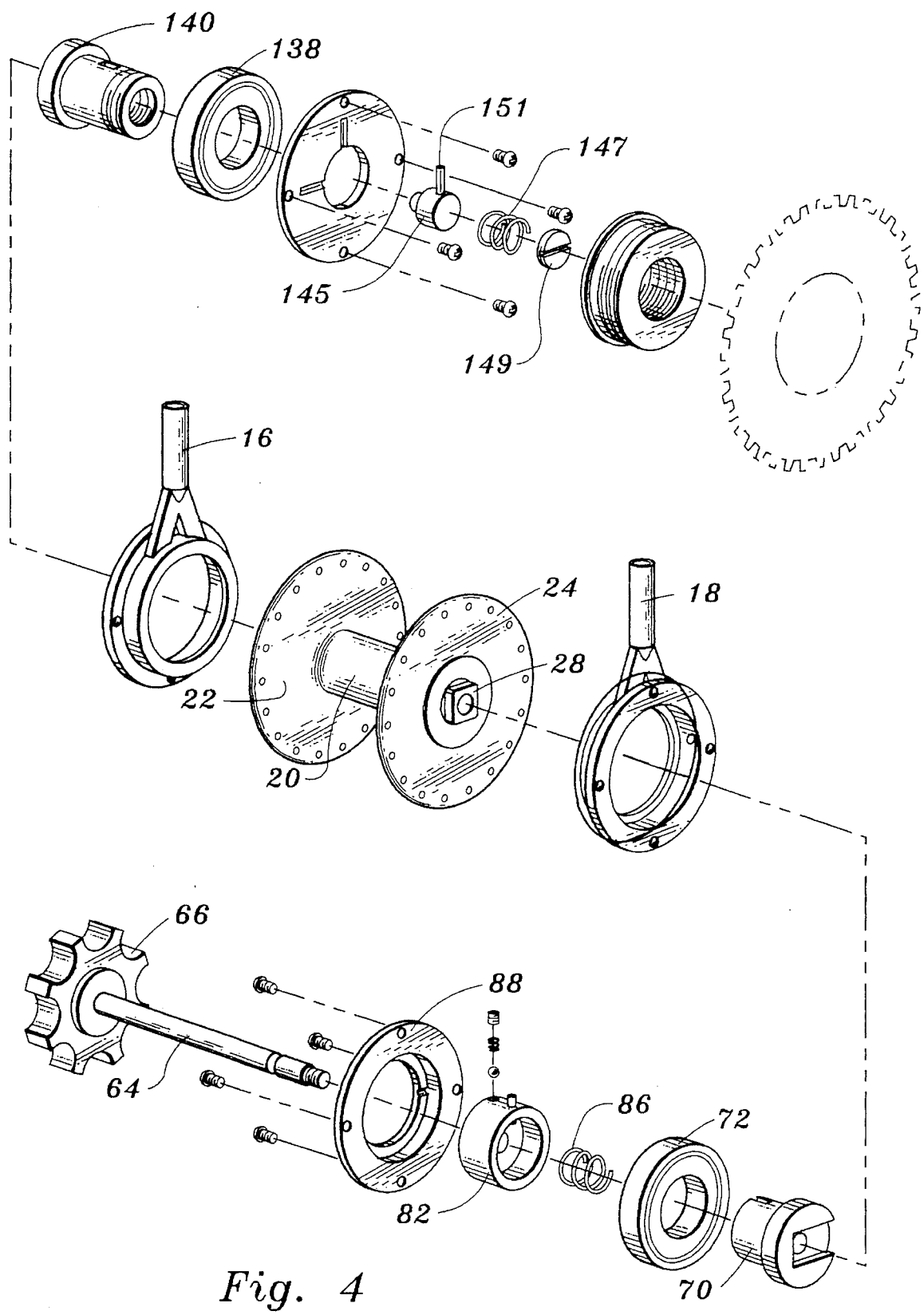
FIG. 4 is a view similar to FIG. 3, but illustrating the structure employed to mount a cycle wheel at the rear of a bicycle.

It is desirable to retain the support spindle shaft connected to distal end 32 of leg 14 after the threaded end of the shaft has been pulled from the interior of the hub. In FIG. 7c, a spring biased locking ball 92 seats in a peripherally extending indent 94 formed in the support spindle shaft for such purpose. FIG. 2 illustrates the cycle wheel removed and the support spindle 64 retained in position on leg 14.

FIGS. 4, 6, 8a and 8b disclose a form of the apparatus utilized at the rear of a bicycle. The apparatus structure at the leg 18 distal end is the same as that employed at leg 14 of the front fork. However, there are some differences in the apparatus for mounting the rear wheel due to the fact that the rear wheel conventionally provides the propulsion for a bicycle.

Figure 6:
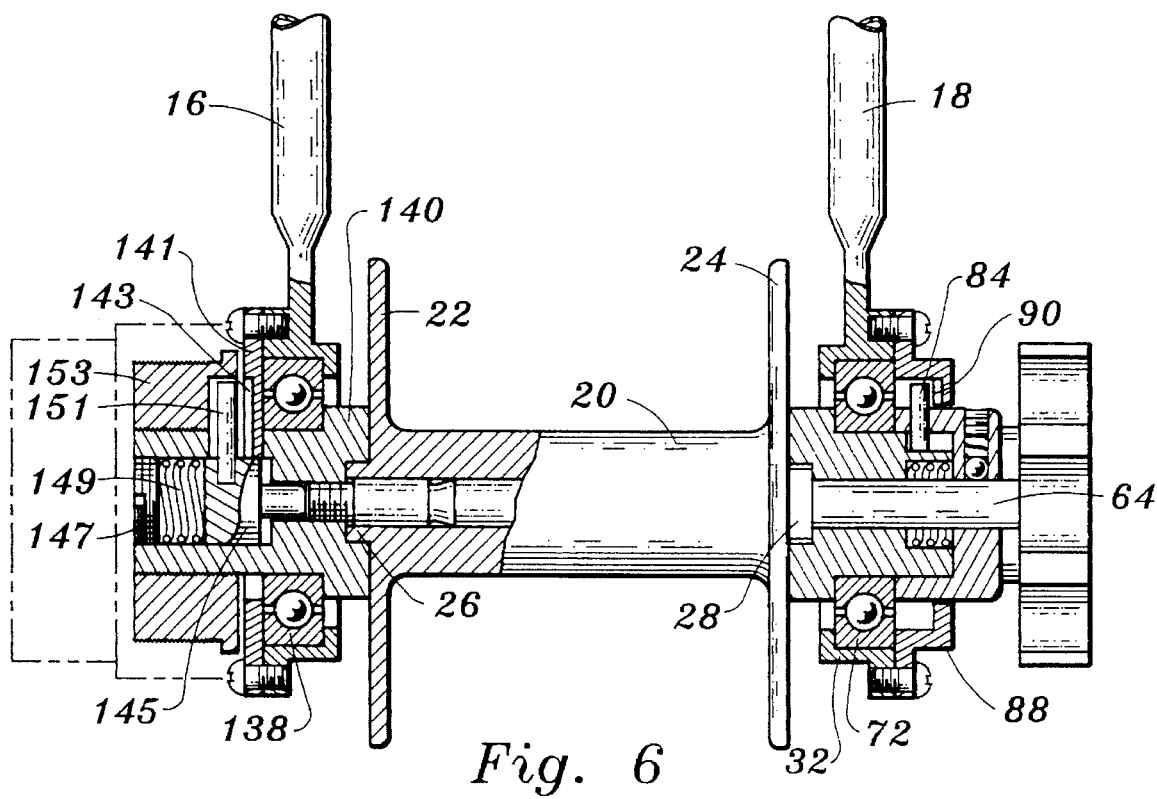
FIG. 6 is a view similar to FIG. 5, but illustrating the structural elements employed when mounting a cycle wheel in the rear position.

At the rear left side as viewed in FIG. 6, a roller bearing 138 is located within the opening of the distal end of leg 16. A socket member 140 is rotatably journaled in the roller bearing. A retention plate 141 is secured over the roller bearing and attached to the leg distal end. An indent 143 is formed in retention plate 141 at the outwardly directed surface thereof. A lock member 145 is slidably disposed within a cavity defined by socket member 140. A spring 147 is retained between the lock member 145 and a screw cap 149 threadedly secured to the socket member. A locking pin 151 is affixed to and extends outwardly from lock member 145.

Figure 8A:
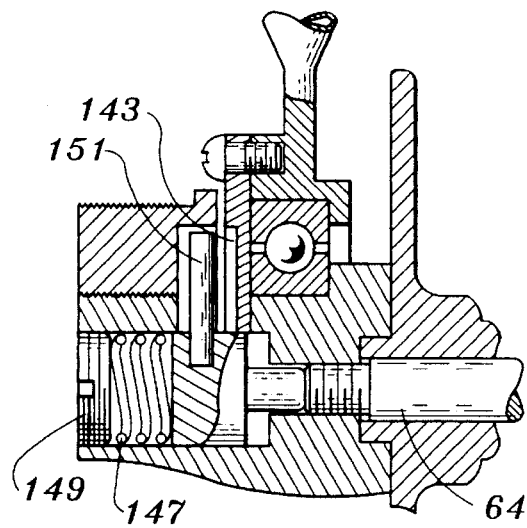
FIGS. 8a and 8b are sectional, detailed views of structural elements employed at a rear fork leg during cycle wheel removal.

Socket member 140 has a threaded throughbore which receives the threaded end of support spindle 64. When the support spindle is completely threadedly engaged with the socket member 140, as shown in FIGS. 6 and 8a, an end of the support spindle 64 engages lock member 145 and pushes same against spring 147. This withdraws the locking pin 151 from indent 143. When, however, the support spindle 64 is unscrewed, the spring 147 will urge the lock member and locking pin toward the right as shown in FIG. 8a, whereupon the locking pin will enter the indent to stop rotation of the socket member and hub when the locking pin and indent are in registry. The right side of the apparatus, i.e. the portion thereof at leg 18, will lock as previously described with regard to the front cycle wheel embodiment.

Another difference between the arrangement shown in FIGS. 4, 6, 8a and 8b is that an interiorly and exteriorly threaded attachment nipple 153 is threadedly secured to the outside of socket member 140. The attachment nipple 153 is utilized to secure the drive sprocket and other drive structure such as gearing to the socket member, as shown in phantom in FIGS. 4 and 6, so that a drive train is completed which will result in the powered rotation of hub 20 by the cyclist.

Figure 10:
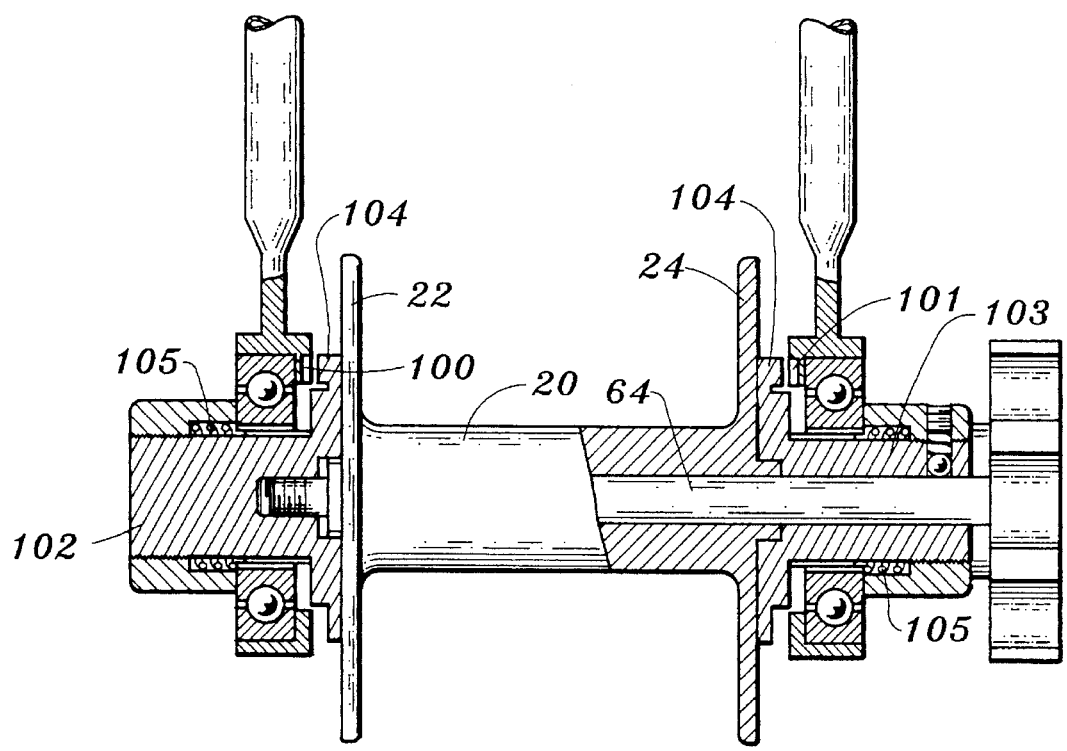
FIGS. 10 and 11 are enlarged, cross-sectional, elevational views illustrating an alternative embodiment of the present invention.
Figure 11:
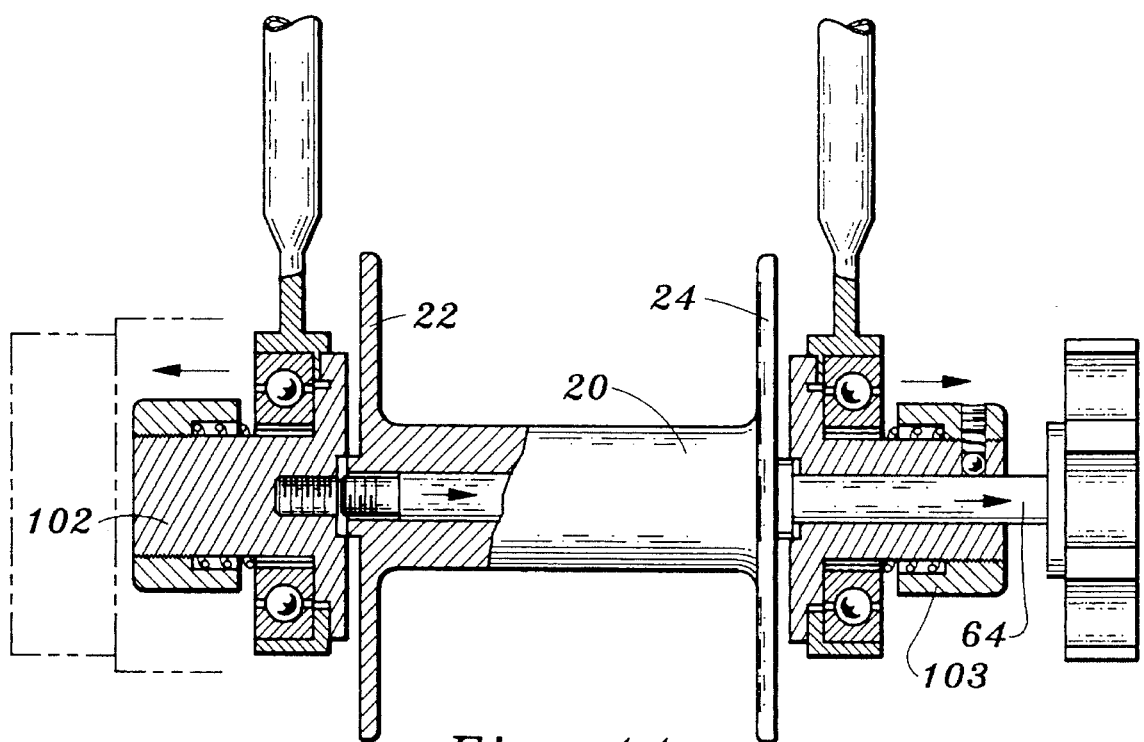

FIG. 10 and 11 show another embodiment of the invention wherein indents 100, 101 are defined by the distal ends of the bicycle fork legs themselves. Two socket members 102, 103 are also employed in this arrangement. The socket members each have a detent 104 integrally formed thereon.

FIG. 10 shows the condition of this form of apparatus when the hub 20 is free to rotate.

Springs 105 urge the socket members outwardly; however, outward movement thereof is prevented by the support spindle 64 when it is fully threadedly engaged with socket member 102.

When the support spindle is rotated and disengaged from socket member 102, both socket member 102 and 103 will move outwardly in the direction indicated by the arrows in FIG. 11 under the urging of the coil compression springs operatively associated therewith. This will enable the detents 104 to enter indents 101 when the cycle wheel is rotated by the individual removing the cycle wheel and the indents and detents are aligned.

I claim:

1. Apparatus for mounting a cycle wheel on a cycle frame, said cycle wheel including a hub having end flanges and first and second wheel supports projecting outwardly from said end flanges, said cycle frame including at least one fork having first and second cycle legs with distal ends, said cycle legs being located away from one another and defining a space therebetween for accommodating said cycle wheel, said apparatus comprising, in combination:

a first socket member located at the distal end of said first cycle leg and defining a first notch and an entry opening to said first notch for receiving and accommodating in said first notch a first wheel support of a cycle wheel;

a second socket member located at the distal end of the second cycle leg and defining a second notch and an entry opening to said second notch for receiving and accommodating in said second notch a second wheel support of a cycle wheel;

a first connector member rotatably connecting said first socket member to the distal end of said first cycle leg with the first socket member projecting into the space between and defined by the cycle legs and the first notch being located in the space between and defined by the cycle legs;

a second connector member rotatably connecting said second socket member to the distal end of said second cycle leg with the second socket member projecting into the space between and defined by the cycle legs and the second notch being located in the space between and defined by the cycle legs, said first and second socket members being in alignment;

lock means for selectively locking said socket members substantially simultaneously against rotational movement relative to their respective cycle legs, said locking means maintaining the entry openings to said first and second notches at the same predetermined orientation with respect to the cycle frame when said socket members are locked against rotational movement; and manually operable actuator means cooperable with said lock means for selectively actuating and deactuating said lock means, said manually operable actuator means at least partially comprising a support spindle for insertion into a cycle wheel hub to rotatably support a cycle wheel and movable between first and second spindle positions, said support spindle when in said first spindle position cooperable with said lock means and said socket members to allow rotational movement of said socket members, and said support spindle when in said second spindle position cooperable with said lock means and said socket members to resist rotational movement of said socket members and maintain the entry openings to said first and second notches at the same predetermined orientation with respect to said cycle frame to facilitate installation of a cycle wheel, said lock means including a first lock located at said first cycle leg and a second lock located at said second cycle leg, each of said first and second locks including a lock element movable relative to a respective socket member between a lock position wherein the lock element engages the socket member and resists rotation of the socket member and an unlock position wherein the locking element allows rotation of the socket member, said support spindle cooperable with both lock elements to move said lock elements between said lock and unlock positions.

2. The apparatus according to claim 1 additionally comprising biasing means for biasing said lock elements to lock position.

3. The apparatus according to claim 2 wherein said support spindle is engageable with said lock elements when moving between said first and second spindle positions to move said lock elements against the bias of said biasing means to unlock position.

4. The apparatus according to claim 1 wherein said lock elements and said socket members include cooperable indents and detents which cooperate to prevent relative rotation between said lock elements and said socket members responsive to movement of the entry openings of said first and second notches to the same predetermined orientation and maintain said entry openings at said predetermined orientation when said socket members are locked against rotational movement.

5. The apparatus according to claim 1 wherein said lock means includes cooperating indents and detents on said distal ends and socket members, seating of said detents in said indents locking said socket members against rotational movement.

6. Apparatus for mounting a cycle wheel on a cycle frame, said cycle wheel including a hub having end flanges and first and second wheel supports projecting outwardly from said end flanges, said cycle including at least one fork having first and second cycle frame legs with distal ends, said cycle legs being located away from one another and defining a space therebetween for accommodating said cycle wheel, said apparatus comprising, in combination:

a first socket member located at the distal end of said first cycle leg and defining a first notch and an entry opening to said first notch for receiving and accommodating in said first notch a first wheel support of a cycle wheel;

a second socket member located at the distal end of the second cycle leg and defining a second notch and an entry opening to said second notch for receiving and accommodating in said second notch a second wheel support of a cycle wheel;

a first connector member rotatably connecting said first socket member to the distal end of said first cycle leg with the first socket member projecting into the space between and defined by the cycle legs and the first notch being located in the space between and defined by the cycle legs;

a second connector member rotatably connecting said second socket member to the distal end of said second cycle leg with the second socket member projecting into the space between and defined by the cycle legs and the second notch being located in the space between and defined by the cycle legs, said first and second socket members being in alignment;

lock means for selectively locking said socket members substantially simultaneously against rotational movement relative to their respective cycle legs, said locking means maintaining the entry openings to said first and second notches at the same predetermined orientation with respect to the cycle frame when said socket members are locked against rotational movement; and manually operable actuator means cooperable with said lock means for selectively actuating and deactuating said lock means, said manually operable actuator means at least partially comprising a support spindle for insertion into a cycle wheel hub to rotatably support a cycle wheel and movable between first and second spindle positions, said support spindle when in said first spindle position cooperable with said lock means and said socket members to allow rotational movement of said socket members, and said support spindle when in said second spindle position cooperable with said lock means and said socket members to resist rotational movement of said socket members and maintain the entry openings to said first and second notches at the same redetermined orientation with respect to said cycle frame to facilitate installation of a cycle wheel, said support spindle including a manually graspable handle and a spindle distal end spaced from said manually graspable handle, said spindle distal end being threadedly engageable with one of said connector members.

7. Apparatus for mounting a cycle wheel on a cycle frame, said cycle wheel including a hub having end flanges and first and second wheel supports projecting outwardly from said end flanges, said cycle frame including at least one fork having first and second cycle legs with distal ends, said cycle legs being located away from one another and defining a space therebetween for accommodating said cycle wheel, said apparatus comprising, in combination:

a first socket member located at the distal end of said first cycle leg and defining a first notch and an entry opening to said first notch for receiving and accommodating in said first notch a first wheel support of a cycle wheel;

a second socket member located at the distal end of the second cycle leg and defining a second notch and an entry opening to said second notch for receiving and accommodating in said second notch a second wheel support of a cycle wheel;

a first connector member rotatably connecting said first socket member to the distal end of said first cycle leg with the first socket member projecting into the space between and defined by the cycle legs and the first notch being located in the space between and defined by the cycle legs; and a second connector member rotatably connecting said second socket member to the distal end of said second cycle leg with the second socket member projecting into the space between and defined by the cycle legs and the second notch being located in the space between and defined by the cycle legs, said first and second socket members being in alignment, and said connector members including bearings facilitating rotational movement of the socket members and said notches relative to said cycle legs.

8. Apparatus for mounting a cycle wheel on a cycle frame, said cycle frame including at least one fork having first and second cycle legs with distal ends, said cycle legs being located away from one another and defining a space therebetween for accommodating a cycle wheel, said apparatus comprising, in combination;

a cycle wheel including a hub having hub ends and first and second wheel supports located at said hub ends, the distance between the first and second wheel supports being less than the distance between the distal ends of the cycle legs, said hub defining a hub opening;

a first rotatable member located at the distal end of said first cycle leg for engagement with the first wheel support of the cycle wheel and defining a first rotatable member opening;

a second rotatable member located at the distal end of the second cycle leg for engagement with the second wheel support of the cycle wheel and defining a second rotatable member opening;

a first connector member including bearings rotatably connecting said first rotatable member to the distal end of said first cycle leg with the first rotatable member projecting into the space between and defined by the cycle legs, said first connector member defining a first connector opening;

a second connector member including bearings rotatably connecting said second rotatable member to the distal end of said second cycle leg with the second rotatable member projecting into the space between and defined by the cycle legs, said second connector member defining a second connector opening, said first and second rotatable member openings being in alignment; and means releasably interconnecting said first and second wheel supports respectively to said first and second rotatable members including a support spindle extending between said cycle legs and passing through said hub opening, said first and second rotatable member openings, and into said first and second connector openings, said wheel supports and said rotatable members being locked against relative movement when the spindle extends between said cycle legs and passes through said hub opening, said first and second rotatable member openings and into said first and second connector openings, and said wheel supports being readily removable from said rotatable members and said cycle wheel being readily removable from the cycle frame when said support spindle is moved relative to said hub opening, said first and second rotatable member openings, and said first and second connector openings.

* * * * *